United States Patent
Benazzi et al.

(10) Patent No.: US 6,733,657 B2
(45) Date of Patent: May 11, 2004

(54) HYDROCRACKING CATALYST HAVING A UNIQUE SILICA-ALUMINA SUBSTRATE

(75) Inventors: Eric Benazzi, Chatou (FR); Tivadar Cseri, Courbevoie (FR); Magalie Roy-Auberger, Bourgoin Jallieu (FR); Patrick Euzen, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 95 days.

(21) Appl. No.: 10/045,678

(22) Filed: Jan. 15, 2002

(65) Prior Publication Data

US 2002/0160911 A1 Oct. 31, 2002

(30) Foreign Application Priority Data

Jan. 15, 2001 (FR) .............................. 01 00470

(51) Int. Cl.[7] ...................... C10G 47/04; C10G 47/20; C10G 47/00; C10G 47/02; B01J 21/08
(52) U.S. Cl. .............. 208/110; 208/111.01; 208/111.05; 208/111.1; 208/111.2; 208/112; 502/84; 502/241; 502/242; 502/246; 502/247; 502/248; 502/254; 502/255; 502/256; 502/257; 502/258; 502/259; 502/260; 502/261; 502/262; 502/263; 502/407; 502/415; 502/439
(58) Field of Search .......................... 502/74, 84, 206, 502/207, 204, 210, 211, 213, 219, 220–223, 228–229, 230, 248, 254–263, 305, 308, 309, 311–312, 313–316, 320–323, 327, 332, 333–339, 351, 355, 407, 415, 439, 241, 242, 246, 247; 208/110, 111.01, 111.05, 111.1, 111.2, 112

(56) References Cited

U.S. PATENT DOCUMENTS

| | | | |
|---|---|---|---|
| 4,139,494 A | | 2/1979 | Itoh et al. |
| 4,174,301 A | * | 11/1979 | Choca et al. ............ 252/455 R |
| 4,239,651 A | | 12/1980 | Alafandi et al. |
| 4,242,236 A | | 12/1980 | Blakely |
| 5,731,261 A | * | 3/1998 | Balducci et al. ............ 502/439 |
| 5,968,348 A | * | 10/1999 | Sherwood, Jr. ........ 208/216 PP |
| 6,030,921 A | * | 2/2000 | Ziemer ........................ 502/325 |
| 6,399,530 B1 | * | 6/2002 | Chen et al. .................... 502/64 |
| 6,534,441 B1 | * | 3/2003 | Bartley et al. .............. 502/337 |

FOREIGN PATENT DOCUMENTS

GB 1324205 7/1973

* cited by examiner

Primary Examiner—Cam N. Nguyen
(74) Attorney, Agent, or Firm—Millen, White, Zelano & Branigan, P.C.

(57) ABSTRACT

A hydrocarbon conversion catalyst contains at least one silica-alumina having the following characteristics: A content by weight of silica $SiO_2$ of between 10 and 60% by weight; an Na content less than 300 ppm by weight; a total pore volume of between 0.5 and 1.2 m/g measured by mercury porosimetry; a porosity of said silica-alumina wherein: the volume of mesopores whose diameter is between 40 Å and 150 Å, and whose mean diameter varies between 80 and 120 Å represents between 30 and 80% of the total pore volume, and (ii) the volume of macropores, whose diameter is greater than 500 Å and preferably between 1000 Å and 10,000 Å represents between 20 and 80% of the total pore volume; a specific surface area greater than 200 m²/g, and at least one hydro-dehydrogenating element selected metals of group VIB and group VIII, and optionally phosphorus, boron, silicon, or elements of group VIIA, VIIB or VB.

24 Claims, No Drawings

HYDROCRACKING CATALYST HAVING A UNIQUE SILICA-ALUMINA SUBSTRATE

This invention relates to a catalyst that comprises at least one silica-alumina, at least one hydro-dehydrogenating element, generally selected from among the metals of group VIB and group VIII of the periodic table (preferably molybdenum and tungsten, cobalt, nickel and iron) and optionally at least one oxide-type binder. The catalyst can also optionally contain at least one element that is selected from the group P, B, Si and optionally at least one element of group VIIA (group 17 of halogens), such as, for example, fluorine, and optionally at least one element of group VIIb (manganese, ruthenium, for example).

This invention also relates to the use of said catalyst for the hydrocracking of hydrocarbon feedstocks such as petroleum fractions, fractions that are obtained from carbon containing aromatic and/or olefinic and/or naphthenic and/or paraffinic compounds, whereby said feedstocks can contain nitrogen and/or oxygen and/or sulfur in the form of organic compounds and optionally heavy metals.

PRIOR ART

The hydrocracking of heavy petroleum fractions is a very important refining process that makes it possible to produce, from excess heavy feedstocks that cannot be readily upgraded, lighter fractions such as gasolines, jet fuels and light gas oils that the refiner seeks to adapt his production to the structure of the demand. Some hydrocracking processes make it possible also to obtain a greatly purified residue that can constitute an excellent base for oils. Relative to the catalytic cracking, the advantage of catalytic hydrocracking is to provide middle distillates, jet fuels and gas oils of very good quality. The gasoline that is produced has an octane number that is much lower than the one that is obtained from catalytic cracking.

The catalysts that are used in hydrocracking are all of the bifunctional type combining an acid function with a hydrogenating function. The acid function is provided by large-surface substrates (150 to 800 $m^2.g^{-1}$ generally) that have a superficial acidity, such as halogenated aluminas (chlorinated or fluorinated in particular), combinations of boron and aluminum oxides, silica-aluminas and zeolites. The hydrogenating function is provided either by one or more metals of group VIII of the periodic table, such as iron, cobalt, nickel, ruthenium, rhodium, palladium, osmium, iridium and platinum, or by a combination of at least one metal of group VI of the periodic table, such as molybdenum and tungsten and at least one metal of group VIII.

The balance between the two acid and hydrogenating functions is the basic parameter that governs the activity and the selectivity of the catalyst. A weak acid function and a strong hydrogenating function provide catalysts that are not very active but that work at a temperature that is generally high (greater than or equal to 390–400° C.) and at a low feed volumetric flow rate (the VVH that is expressed by volume of feedstock to be treated per unit of volume of catalyst and per hour is generally less than or equal to 2) but endowed with a very good selectivity of middle distillates. Conversely, a strong acid function and a weak hydrogenating function provide active catalysts but exhibit less favorable selectivities of middle distillates (jet fuels and gas oils). The search for an improved catalyst will therefore be centered on a judicious choice of each of the functions to adjust the activity/selectivity pair of the catalyst.

In the substrates that are not very acidic, the family of silica-aluminas is found. Many hydrocracking catalysts with a silica-alumina base are combined either with a metal of group VIII or, preferably when the contents of heteroatomic poisons of the feedstock to be treated exceed 0.5% by weight, a combination of metal sulfides of groups VIB and VIII).

Patent EP-666894-B2 teaches us that the use of a catalyst that comprises a hydrogenation component that is supported by a silica-alumina having a macroporosity (pore diameter of greater than 100 nm) that varies from 5% to 50% of the total pore volume, a total pore volume that fluctuates from 0.6 ml/g to 1.2 ml/g and an alumina content that is located in the range of 5 to 75% by weight makes it possible, in the presence of hydrogen, to treat particular feedstocks so as to obtain lubricating base oils that have a viscosity number of greater than 135. The hydrocarbon feedstock is selected from among (i) sludges, (ii) synthetic paraffin waxes and (iii) feedstocks that are obtained from a paraffinic crude that contains at least 30% by weight of wax or paraffin and that has at least 80% by weight of compounds that boil above 300° C. and at most 30% by weight of compounds that boil above 540° C.

The research work carried out by the applicant on many acidic solids and on the hydrogenating active phases led him to discover that, in a surprising way, selectivities of middle distillates (kerosene+ gas oil) that are higher than with the catalysts that contain a silica-alumina and that are known in the prior art are obtained with the catalyst according to the invention. Furthermore, very advantageously, this catalyst makes it possible to obtain higher gas oil selectivities than those of kerosene. Said catalyst comprises at least one particular silica-alumina, optionally at least one binder (generally porous, such as alumina), at least one element of group VIB of said classification (such as chromium, molybdenum or tungsten, preferably molybdenum or tungsten), even more preferably tungsten, optionally an element of group VIII (i.e., an element that is selected from the group that consists of: Fe, Ru, Os, Co, Rh, Ir, Nl, Pd, Pt, preferably iron, cobalt or nickel), optionally at least one element that is selected from the group that is formed by P, B and Si (preferably B and/or Si), optionally one element of group VIIA (and preferably fluorine) and optionally at least one element of group VIIB (and preferably manganese, ruthenium).

It was possible to observe that in hydrocracking, this catalyst has an activity that is at least equal and a middle distillate selectivity that is greater relative to the catalytic formulas that are known from the prior art.

DETAILED DESCRIPTION OF THE INVENTION

The invention has as its object a catalyst that comprises at least one hydro-dehydrogenating element (preferably deposited on the substrate), and a substrate that comprises (or preferably is constituted by) at least one silica-alumina, whereby said silica-alumina has the following characteristics:

a content by weight of silica $SiO_2$ of between 10 and 60%, preferably between 20 and 60%, and even more preferably between 30 and 50% by weight, an Na content that is less than 300 ppm by weight and preferably less than 200 ppm by weight, a total pore volume of between 0.5 and 1.2 ml/g that is measured by mercury porosimetry, whereby the porosity of said silica-alumina is as follows:
  i/ The volume of mesopores whose diameter is between 40 Å and 150 Å and whose mean diameter varies between 80 and 120 Å represents between 30 and 80% of the total pore volume that is defined above and preferably between 40 and 70%.

ii/ The volume of the macropores, whose diameter is greater than 500 Å and preferably between 1000 Å and 10,000 Å, represents between 20 and 80% of the total pore volume and preferably between 30 and 60% of the total pore volume, and even more preferably the volume of the macropores represents at least 35% of the total pore volume.

A specific surface area that is greater than 200 m$^2$/g and preferably greater than 250 m$^2$/g.

The following measurements have also been carried out on the silica-alumina:

The diffractograms of the silica-aluminas of the invention, obtained by x-ray diffractions, correspond to a mixture of the silica and alumina with a certain evolution between gamma alumina and the silica based on the SiO$_2$ content of the samples. In these silica-aluminas, a less well crystallized alumina relative to the alumina by itself is observed, The spectra of the NMR of $^{27}$Al of the silica-aluminas show two solid masses with separate peaks. Each solid mass can be decomposed into at least two species. We observe extensive domination of the species whose maxima resonate toward 10 ppm and which extends between 10 and 60 ppm. The position of the maxima suggests that these species are essentially of Al$_{VI}$ type (octahedral). In all of the spectra, we observe a second species type that resonates toward 80–110 ppm. These species would correspond to Al$_{IV}$ atoms (tetrahedral). For silica contents of this invention (between 10 and 60%), the tetrahedral Al$_{IV}$ proportions are close and are established around 20 to 40% and preferably between 24 and 31%.

The environment of the silicon of the silica-aluminas studied by the NMR of $^{29}$Si show the chemical shifts of various silicon species such as O$^4$ (−105 ppm to 120 ppm), Q$^3$ (−90 ppm to −102 ppm) and Q$^2$ (−75 ppm to −93 ppm). The sites with a chemical shift at −102 ppm can be sites of Q$^3$ or Q$^4$ type; in this work we will call them sites Q$^{3-4}$. The silica-aluminas the invention are composed of silicon of types Q$^2$, Q$^3$, Q$^{3-4}$ and Q$^4$. Many species would be of type Q$^2$, approximately on the order of 30 to 50%. The proportion of species Q$^3$ is also significant, approximately on the order of 10 to 30%. The definitions of the sites are as follows:

Q$^4$ sites: Si linked to 4 Si (or Al)
Q$^3$ sites: Si linked to 3 Si (or Al) and 1 OH
Q$^2$ sites: Si linked to 2 Si (or Al) and 2 OH;

The homogeneity of the substrates was evaluated by Transmission Electron Microscopy. By this method, we seek to verify the homogeneity of the distribution of Si and Al on the nanometric scale. The analyses are carried out on ultrafine fractions of the substrates by probes of different size, 50 nm or 15 nm. For each solid studied, 32 spectra are recorded, including 16 with a 50 nm probe and 16 with a 15 nm probe. For each spectrum, Si/Al atomic ratios are then calculated with the means of ratios, the minimum ratio, the maximum ratio and the standard deviation of the series. The mean of the Si/Al ratios measured by Transmission Electron Microscopy for the various silica-aluminas are close to the Si/Al ratio that is obtained by X-fluorescence. The evaluation of the homogeneity criterion is done on the standard deviation value. According to these criteria, a large number of silica-aluminas of this invention can be considered as heterogeneous because they have Si/Al atomic ratios with standard deviations on the order of 30–40%.

The substrate can consist of pure silica-alumina or results from the mixing with said silica-alumina with a binder such as silica (SiO$_2$), alumina (Al$_2$O$_3$), clays, titanium oxide (TiO$_2$), boron oxide (B$_2$O$_3$) and zirconium (ZrO$_2$) and any mixture of the binders cited above. The preferred binders are silica and alumina and even more preferably alumina in all of these forms that are known to one skilled in the art, for example gamma-alumina. The content by weight of binder in the substrate of the catalyst is between 0 and 40%, more particularly between 1 and 40% and even more preferably between 5% and 20%. The result is that the content by weight of silica-alumina is 60–100%. The catalysts according to the invention, however, whose substrate consists only of silica-alumina without any binder, are preferred.

The substrate can be prepared by shaping the silica-alumina in the presence or the absence of binder by any technique that is known to one skilled in the art. The shaping can be carried out, for example, by extrusion, by pelletizing, by the drop (oil-drop) coagulation method, by turntable granulation or by any other method that is known to one skilled in the art. At least one calcination can be carried out after any one of the stages of the preparation; it is usually carried out in air at a temperature of at least 150° C., preferably at least 300° C.

The catalyst of this invention, in addition to the substrate constituted by the silica-alumina and optionally a binder, also contains, generally in % by weight relative to the total mass of the catalyst:

1 to 60%, advantageously 2 to 60%, preferably 2 to 50% and even more preferably 2 to 40% of at least one hydro-dehydrogenating metal that is preferably selected from among the elements of group VIII and group VIB, 0 to 20%, preferably 0.1 to 15%, and even more preferably 0.1 to 10% of at least one promoter element that is selected from the group that consists of silicon, boron and phosphorus, not including the silicon that is obtained from the silica-alumina of the substrate, preferably the element is boron and/or silicon, 0 to 20%, preferably 0.1 to 15% and even more preferably 0.1 to 10% of at least one element that is selected from the group VIIA, preferably fluorine, 0 to 20%, preferably 0.1 to 15%, or else 0.1) 10% of at least one element that is selected from the group VIIB, preferably manganese, rhenium, 0 to 20%, preferably 0.1 to 15% or else 0.1 to 10% of at least one element that is selected from group VB, preferably niobium.

The catalyst that comprises at least one silica-aluminum as described above in the Patent, also comprises a hydrogenating function that is generally preferably ensured by at least one metal that is selected from the group that is formed by the metals of group VIB and group VIII of the periodic table.

In an implementation of the invention, the catalyst preferably comprises at least one element that is selected from the group that is formed by boron, silicon and phosphorus. The catalyst optionally contains at least one element of group VIIA, preferably chlorine and fluorine, and also optionally at least one element of group VIIB.

The boron, silicon and/or phosphorus are preferably located on the silica-alumina and/or the substrate in the case where a binder was used for the shaping of the silica-alumina.

The element that is introduced, and in particular silicon, is primarily located on the silica-alumina and/or the substrate and can be characterized by techniques such as the Casting microprobe (distribution profile of various salts), transmission electron microscopy, combined with an X analysis of the components of catalysts, or else by combining distribution mapping of the elements that are present in the catalyst by electronic microprobe.

The metals of group VIB and of group VIII of the catalyst of this invention can be present completely or partially in metallic form and/or oxide form and/or sulfide form.

The catalysts according to the invention can be prepared according to all of the methods that are well known to one skilled in the art.

A preferred process for preparation of the catalyst according to this invention comprises the following stages:

a) A solid that is referred to below as the precursor is dried and weighed, whereby this solid contains at least the following compounds: optionally at least one matrix, at least one silica-alumina that has the characteristics described above, optionally at least one element that is selected by the elements of group VIB and group VIII, optionally at least one element that is selected from the group of phosphorus, boron and silicon, optionally at least one element of group VIIA, optionally at least one element of group VB, whereby the whole is preferably shaped, b) the dry solid that is obtained in stage a) is calcined at a temperature of at least 150° C., c) the moist solid is left under a moist atmosphere at a temperature of between 10 and 120° C., d) the moist solid that is obtained in stage c) is dried at a temperature of between 60 and 150° C.

The preparation of the precursor of stage a) above can be carried out according to all of the standard methods of one skilled in the art. According to another preferred process for preparation, the precursor is obtained by direct shaping of the silica-alumina by itself or by shaping of the silica-alumina with at least one binder, then drying and calcination. The elements of groups VIB and/or VIII, and optionally those that are selected from among phosphorus, boron, silicon and optionally the elements of groups VIIA, VB, and VIIB are then optionally introduced by any methods that are known to one skilled in the art at any of stages a) to d) before or after the shaping and before or after the calcination of the precursor or the catalyst.

The hydrogenating element can be introduced at any stage of the preparation, preferably during the mixing, or very preferably after shaping. The shaping is followed by a calcination, and the hydrogenating element can also be introduced before or after this calcination. The preparation generally ends by a calcination at a temperature of 250 to 600° C. Another one of the preferred methods according to this invention consists in shaping the silica-alumina without a binder by carrying out a mixing of the latter in the presence of, for example, a peptizing agent for several tens of minutes then in passing the paste that is thus obtained through a die to form extrudates with a diameter of between 0.4 and 4 mm. The hydrogenating function can then be introduced in part only (case, for example, of combinations of metal oxides of groups VIB and VIII), or completely, at the time of the mixing. It can also be introduced by one or more ion exchange operations on the calcined substrate that consists of at least one silica-alumina, optionally shaped with a binder, with the aid of solutions that contain the precursor salts of metals that are selected when the latter belong to group VIII. It can also be introduced by one or more operations for impregnation of the substrate that is shaped and calcined by a solution of the precursors of the metal oxides of groups VIII (in particular the cobalt and nickel) when the precursors of the metal oxides of group VIB (in particular molybdenum or tungsten) were previously introduced at the time of mixing of the substrate. It can finally also be introduced by one or more operations for impregnation of the calcined substrate that consists of at least one silica-alumina according to the invention and optionally at least one binder, by solutions that contain the precursors of metal oxides of groups VI and/or VIII, whereby the precursors of the metal oxides of group VIII are preferably introduced after those of group VIB or at the same time as the latter.

In a preferred way, the substrate is impregnated by an aqueous solution. The impregnation of the substrate is preferably carried out by the so-called "dry" impregnation method that is well known to one skilled in the art. The impregnation can be carried out in a single stage by a solution that contains all of the constituent elements of the final catalyst.

The catalyst of this invention can therefore contain at least one element of group VIII, such as iron, cobalt, nickel, ruthenium, rhodium, palladium, osmium, iridium or platinum. Among the metals of group VIII, it is preferred to use a metal that is selected from the group that is formed by iron, cobalt, nickel and ruthenium. The catalyst according to the invention can also contain at least one element of group VIB, preferably tungsten and molybdenum. In an advantageous manner, the following metal combinations are used: nickel-molybdenum, cobalt-molybdenum, iron-molybdenum, iron-tungsten, nickel-tungsten, cobalt-tungsten; the preferred combinations are: nickel-molybdenum, cobalt-molybdenum, nickel-tungsten and cobalt-tungsten. It is also possible to use three-metal combinations, for example nickel-cobalt-molybdenum and nickel-cobalt-tungsten. In an advantageous manner, the following metal combinations are used: nickel-niobium-molybdenum, cobalt-niobium-molybdenum, iron-niobium-molybdenum, nickel-niobium-tungsten, cobalt-niobium-tungsten, iron-niobium-tungsten, whereby the preferred combinations are: nickel-niobium-molybdenum, and cobalt-niobium-molybdenum. It is also possible to use combinations of four metals, for example nickel-cobalt-niobium-molybdenum. It is also possible to use combinations that contain a noble metal, such as ruthenium-niobium-molybdenum or else ruthenium-nickel-niobium-molybdenum.

The following elements: boron and/or silicon and/or phosphorus and optionally (the) element(s) that are selected in group(s) VIIA, VIIB and VB can be introduced into the catalyst at any level of the preparation and according to any technique that is known to one skilled in the art.

A preferred method according to the invention consists in placing the promoter element or elements that are selected, for example the boron-silicon pair, on the precursor which may or may not be calcined, but preferably is calcined. For this, an aqueous solution is prepared with at least one boron salt such as ammonium biborate or ammonium pentaborate in an alkaline medium and in the presence of oxidized water, and a so-called dry impregnation is initiated, in which the volume of the pores of the precursor is filled by the solution that contains, for example, boron. In the case where silicon is also deposited, for example, a solution of a compound of the silicone-type silicon or the emulsion type of silicone oil will be used.

The deposition of boron and silicon can also be carried out simultaneously by using, for example, a solution that contains a boron salt and a silicone-type silicon compound. Thus, for example, in the case where the precursor is a nickel-tungsten-type catalyst supported on silica-alumina, it is possible to impregnate this precursor by the aqueous solution of ammonium biborate and Rhodorsil E1P silicon from the Rhodia Company, to initiate a drying, for example, at 120° C., then to impregnate by an ammonium fluoride solution, to initiate a drying, for example, at 120° C., and to initiate a calcination, for example, and preferably in air in a flushed bed, for example at 500° C. for 4 hours.

The promoter element that is selected from the group that is formed by silicon, boron and phosphorus, and the element that is selected from among the halide ions of group VIIA as well as the elements of groups VIIB and VB can be introduced by one or more impregnation operations with excess solution on the calcined precursor.

Thus, for example, it is possible to impregnate the precursor by an aqueous solution of ammonium biborate or Rhodorsil ElP silicone of the Rhône Poulenc Company to initiate drying at, for example, 120° C., and then to impregnate by an ammonium fluoride solution, to initiate drying at, for example, 120° C., and to initiate calcination, for example and preferably in air in a flushed bed, for example at 500° C. for 4 hours. The element of group VB and/or VIIB is then deposited according to any method that is known to one skilled in the art.

Other impregnation sequences can be used to obtain the catalyst according to the invention.

It is possible, for example, to impregnate the precursor with a solution that contains one of the promoter elements (P, B, Si), to dry, to calcine and then to impregnate the solid that is obtained with the solution that contains another promoter element, to dry, to calcine. It is also possible to impregnate the precursor with a solution that contains two of the promoter elements, to dry, to calcine and then to impregnate the solid that is obtained with the solution that contains another promoter element, to dry, and to initiate a final calcination.

In the case where the elements are introduced into several impregnations of corresponding precursor salts, an intermediate calcination stage of the catalyst should be carried out at a temperature of, for example and preferably, between 250 and 600° C.

The impregnation of the molybdenum can be facilitated by the addition of phosphoric acid into ammonium paramolybdate solutions, which makes it possible also to introduce the phosphorus so as to promote catalytic activity. Other phosphorus compounds can be used as is well known to one skilled in the art.

The impregnation of niobium can be facilitated by the addition of oxalic acid and optionally ammonium oxalate in the niobium oxalate solutions. Other compounds can be used to improve the solubility and to facilitate the impregnation of niobium as is well known to one skilled in the art.

The preferred phosphorus source is orthophosphoric acid $H_3PO_4$, but its salts and esters, such as the ammonium phosphates, are also suitable. The phosphorus can, for example, be introduced in the form of a mixture of phosphoric acid and a basic organic compound that contains nitrogen, such as ammonia, primary and secondary amines, cyclic amines, compounds of the pyridine family and quinolines and compounds of the pyrrole family.

Many silicon sources can be used. Thus, it is possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. The silicomolybdic acid and its salts, and the silicotungstic acid and its salts can also be used advantageously. The silicon can be added by, for example, impregnation of ethyl silicate in solution in a water/alcohol mixture. The silicon can be added by, for example, impregnation of a silicon compound of silicone type or the silicic acid that is suspended in water.

The boron source may be boric acid, preferably orthoboric acid $H_3BO_3$, ammonium biborate or ammonium pentaborate, boron oxide, or boric esters. Boron can be introduced, for example, in the form of a mixture of boric acid, oxidized water and a basic organic compound that contains nitrogen, such as ammonia, primary and secondary amines, cyclic amines, the compounds of the pyridine family and quinolines, and the compounds of the pyrrole family. Boron may be introduced by, for example, a solution of boric acid in a water/alcohol mixture.

The sources of elements of group VIIA that can be used are well known to one skilled in the art. For example, the fluoride anions can be introduced in the form of hydrofluoric acid or its salts. These salts are formed with alkaline metals, ammonium or an organic compound. In the latter case, the salt is advantageously formed in the reaction mixture by reaction between the organic compound and the hydrofluoric acid. It is also possible to use hydrolyzable compounds that can release fluoride anions into the water, such as ammonium fluorosilicate $(NH_4)_2SiF_6$, silicon tetrafluoride $SiF_4$ or sodium tetrafluoride $Na_2SiF_6$. Fluorine may be introduced by, for example, impregnation of an aqueous solution of hydrofluoric acid or ammonium fluoride.

The sources of elements of group VIB that can be used are well known to one skilled in the art. For example, among the sources of molybdenum and tungsten, it is possible to use oxides and hydroxides, molybdic and tungstic acids and their salts, in particular the ammonium salts such as ammonium molybdate, ammonium heptamolybdate, ammonium tungstate, phosphomolybdic acid, phosphotungstic acid and their salts, silicomolybdic acid, silicotungstic acid and their salts. Ammonium oxides and salts such as ammonium molybdate, ammonium heptamolybdate and ammonium metatungstate are preferably used.

The sources of elements of group VIII that can be used are well known to one skilled in the art. For example, for the non-noble metals, nitrates, sulfates, phosphates, halides, for example chlorides, bromides and fluorides, and carboxylates, for example acetates and carbonates, will be used. For noble metals, halides, for example chlorides, nitrates, acids such as chloroplatinic acids, and oxychlorides, such as ammoniacal ruthenium oxychloride, will be used.

In a general way, the catalysts according to the invention are used for the treatment of hydrocarbon fractions.

The catalysts that are thus obtained are advantageously used for hydrocracking, in particular hydrocarbon fractions (for example of vacuum distillate type, deasphalted or hydrotreated residues or the equivalent). The heavy fractions preferably comprise at least 80% by volume of compounds whose boiling points are at least 350° C. and preferably between 350 and about 600° C. They generally contain heteroatoms, such as sulfur and nitrogen. The nitrogen content is usually between 100 and 5000 ppm by weight, and the sulfur content is between 0.01 and 5% by weight.

The catalyst of this invention can be used alone, in a single or several catalytic beds in a one-stage hydrocracking arrangement, with or without liquid recycling in the hydrocracking of the unconverted fraction, preferably combined with a hydrotreatment catalyst that is located upstream from the catalyst of this invention. In a two-stage hydrocracking arrangement with intermediate separation between the two hydrocracking reactors, the catalyst of this invention can be used in one or in two reactors that may or may not be combined with a hydrotreatment catalyst that is located upstream from the catalyst of this invention.

The feedstocks that are used in the process are most often heavy gas oils, vacuum gas oils, atmospheric residues, vacuum residues, atmospheric distillates, vacuum distillates, heavy fuels, oils, (waxes and paraffins), waste oils, residues or deasphalted crudes, feedstocks that are obtained from thermal or catalytic conversion processes and their mixtures. They can contain heteroatoms such as sulfur, oxygen and nitrogen and optionally metals or can have been probably pretreated (hydrorefining/hydrotreatment) to reduce the heteroatom content. The feedstocks preferably contain less than 30% by weight of paraffins and, better, less than 25% or else less than 20%.

The hydrocracking conditions such as temperature, pressure, hydrogen recycling rate, hourly volumetric flow rate, can be very variable based on the nature of the feedstock, the quality of the desired products and installations used by the refiner. The temperature is generally greater than 200° C. and often between 250° C. and 480° C. The pressure is greater than 0.1 MPa and often greater than 1 MPa. The amount of hydrogen is at least 50 liters of hydrogen per liter of feedstock and often between 80 and 5000 liters of hydrogen per liter of feedstock. The hourly volumetric flow rate is generally between 0.1 and 20 volumes of feedstock per volume of catalyst and per hour ($h^{-1}$).

The catalysts of this invention are preferably subjected to a sulfurization treatment that makes it possible to transform, at least in part, the metallic or oxide species (elements of the catalyst) into sulfur before they are brought into contact with the feedstock to be treated. This treatment of activation by sulfurization is well known to one skilled in the art and can be carried out by any method that is already described in the literature.

The sulfurization can be done by any method that is known to one skilled in the art and at any stage of the preparation. The preferred method according to the invention consists in heating the uncalcined catalyst under a stream of a hydrogen-hydrogen sulfide mixture or under a stream of a nitrogen-hydrogen sulfide mixture or else under pure hydrogen sulfide at a temperature of between 150 and 800° C., preferably between 250 and 600° C., generally in a reaction zone with a flushed bed.

The sulfur source can be elementary sulfur, carbon sulfide, hydrogen sulfide, sulfur-containing hydrocarbons such as dimethyl sulfide, dimethyl disulfide, mercaptans, thiophene compounds, thiols, polysulfides such as, for example, di-tert-nonylpolysulfide or TPS-37 of the ATOCHEM Company, the petroleum fractions that are high in sulfur, such as gasoline, kerosene, gas oil, by themselves or in mixtures with one of the sulfur-containing compounds cited above. The preferred sulfur source is carbon sulfide or hydrogen sulfide.

In a general way, the middle distillate selectivities that are obtained are at least 65% or greater than 65% by weight, and the gas oil/kerosene ratios are at least 1.3 and most often greater than 1.3 or at least 1.4 (% by weight/% by weight).

The following examples illustrate the invention without, however, limiting its scope.

EXAMPLE 1
Preparation of Catalyst C1 According to the Invention

Substrate A is a silica-alumina that has a chemical composition of 40% by weight of $SiO_2$ and 60% by weight of $Al_2O_3$. Its Si/Al molar ratio is 0.56. Its Na content is on the order of 100–120 ppm by weight. It is in the form of cylindrical extrudates with a 1.7 mm diameter. Its specific surface area is 320 $m^2/g$. Its total pore volume, measured by mercury porosimetry, is 0.83 cc/g. The pore distribution is bimodal. In the domain of mesopores, we observe a wide peak between 40 and 150 Å with a maximum of dV/dD toward 70 Å. In the substrate, macropores that have a size of greater than 500 Å represent about 40% of the total pore volume.

Catalyst C1 is obtained by dry impregnation of substrate A by an aqueous solution that contains tungsten and nickel salts. The tungsten salt is ammonium metatungstate $(NH_4)_6H_2W_{12}O_{40}*4H_2O$ and that of nickel is nickel nitrate $Ni(NO_3)_2*6H_2O$. After maturation at ambient temperature in a water-saturated atmosphere, the impregnated extrudates are dried at 120° C. for one night, then calcined at 500° C. in dry air. The final content of $WO_3$ is 25% by weight. The final content of NiO is 3.5% by weight.

EXAMPLE 2
Preparation of Catalyst C2 According to the Invention

Catalyst C2 is obtained by dry impregnation of catalyst C1 by a solution that contains ammonium biborate $[(NH_4)_2B_4O_7*4H_2O]$ and the silicone emulsion Rhodorsil EP1 of Rhodia. After maturation at ambient temperature in a water-saturated atmosphere, the impregnated extrudates are dried at 120° C. for one night, then calcined at 500° C. in dry air. The final content of $B_2O_3$ is 3.2% by weight. The final content of reimpregnated $SiO_2$ is 2.14% by weight.

EXAMPLE 3
Preparation of Catalyst C3 According to the Invention

Catalyst C3 is obtained by dry impregnation of catalyst C1 by a solution that contains ammonium biborate. After maturation at ambient temperature in a water-saturated atmosphere, the impregnated extrudates are dried at 120° C. for one night then calcined at 500° C. in dry air. The final content of $B_2O_3$ is 3.2% by weight.

EXAMPLE 4
Preparation of Catalyst C4 According to the Invention

Catalyst C4 is obtained by dry impregnation of catalyst C1 by a solution that contains the silicone emulsion Rhodorsil EP1. After maturation at ambient temperature in a water-saturated atmosphere, the impregnated extrudates are dried at 120° C. for one night, then calcined at 500° C. in dry air. The final content of reimpregnated $SiO_2$ is 2.14% by weight.

EXAMPLE 5
Evaluation of Catalysts C1, C2, C3, C4 and C5

The catalysts whose preparations are described in the preceding examples are used under hydrocracking conditions of a vacuum distillate whose main characteristics are provided in the following table:

| Type of Feedstock | Vacuum Distillate |
|---|---|
| Density at 20° C. | 0.904 |
| Pour point ° C. | +21 |
| Sulfur % by weight | 2.2 |
| Nitrogen ppm by weight | 620 |
| Simulated distillation | |
| DS: Starting point ° C. | 345 |
| DS: 05%p ° C. | 368 |
| DS: 10%p ° C. | 375 |
| DS: 50%p ° C. | 402 |
| DS: 90%p ° C. | 428 |
| DS: End point ° C. | 467 |

The test is conducted in a pilot reactor with a flushed fixed bed, whereby the fluids circulate upward (up-flow). The sulfurization of the catalyst is carried out at 120 bar, at 350° C. with a direct distillation gas oil treated with 2% by weight of DMDS.

After sulfurization, the catalytic test is carried out under the following conditions:

| | |
|---|---|
| Total pressure | 14 MPa |
| VVH | 0.65 h$^{-1}$ |

The catalytic performances of the tested catalysts are provided in the table below. The catalytic performances are expressed by the temperature that makes it possible to reach a gross conversion level of 80%, by the coarse selectivity of middle distillate for a gross conversion of 80%, and the ratio of gas oil yield/jet fuel yield in the middle distillate fraction for a gross conversion of 80%. They are expressed from the simulated distillation results (ASTM D86 method).

Gross conversion CB is assumed to be equal to:
CB=% by weight of 380° C.$^{less}$ in the effluent
Coarse selectivity SB is assumed to be equal to:
SB=100*(weight of the fraction (150° C.–380° C.)/weight of the fraction 380° C.$^{less}$ in the effluent)
The gas oil yield/jet fuel yield (GO/KER ratio) in the middle distillate fraction is assumed to be equal to:
The GO/KER ratio=yield of the fraction (250° C.–380° C.) of the effluent/yield of the fraction (150° C. to less than 250° C.) in the effluent Activity of Catalysts in Hydrocracking of Vacuum Distillates

| Catalyst | T° C. for 80% gross conversion | SB % by weight | GO/KER report % by weight/ % by weight |
|---|---|---|---|
| C1 | 398 | 69 | 1.50 |
| C2 (Bsi) | 394 | 69 | 1.40 |
| C3 (B) | 396 | 69 | 1.45 |
| C4 (Si) | 396 | 69 | 1.47 |

The catalytic results indicate that catalyst C1 that is supported on a particular silica-alumina according to the invention is very converting and primarily very selective in middle distillate. In addition, in the middle distillate fraction, we obtain a high GO/KER ratio. Catalyst C1 therefore has a particularly high selectivity in gas oil, a fraction particularly sought by the applicant. The performances of catalyst C1 are linked to the particular acidity of catalyst C1 that is supported on a particular silica-alumina. The use of this silica-alumina as a substrate is therefore particularly advantageous for obtaining very active hydrocracking catalysts that are very selective in middle distillate.

It is also noted that catalysts C2, C3 and C4, obtained from catalyst C1, respectively by addition of BSi, B and Si, have improved activities relative to catalyst C1. The middle distillate selectivities are identical. Even so, in catalysts C2, C3 and C4, we observe the GO/KER ratios to be slightly different relative to that of catalyst C1. With an increase in the activity of the catalysts, we observe the reduction of the GO/KER ratio.

The preceding examples can be repeated with similar success by substituting the generically or specifically described reactants and/or operating conditions of this invention for those used in the preceding examples.

The entire disclosures of all applications, patents and publications, cited above or below, and of corresponding French application No. 01/00.470, filed Jan. 15, 2001 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A catalyst comprising at least one hydro-dehydragenating element and a substrate comprising silica-alumina material, wherein said silica-alumina material having the following characteristics:
   a silica content of 10–60% by weight,
   a sodium content of less than 300 ppm by weight,
   a total pore volume of between 0.5 and 1.2 ml/g,
   a volume of mesopores with a diameter of between 40–150 Å, and a mean diameter of between 80–120 Å representing 30–80% of the total pore volume,
   a volume of macropores with a diameter of greater than 500 Å representing 20–80% of the total pore volume, and
   a specific surface area of greater than 200 m$^2$/g.

2. A catalyst according to claim 1, wherein the silica-alumina comprises Al$_{VI}$ (octahedral) species and Al$_{IV}$ (tetrahedral) species, and wherein the proportion of the tetrahedral Al$_{IV}$ is between 20% and 40%.

3. A catalyst according to claim 1, wherein the silica-alumina comprises 30–50% of Q$^2$ species wherein an Si atom is linked to two Si or Al atoms and to two OH groups, and also comprises 10–30% of Q$^3$ species wherein an Si atom is linked to three Si or Al atoms and to an OH group.

4. A catalyst according to claim 1, further containing at least one of boron and silicon.

5. A catalyst according to claim 4 further containing at least one element from groups VIIA, VIIB, and VB.

6. A catalyst according to claim 1, further containing at least one element selected from the group consisting of elements among groups VIIA, VIIB, and VB.

7. A catalyst according to claim 6, wherein the substrate consists of said silica-alumina.

8. A catalyst according to claim 6, said substrate comprises 1–40% by weight of a binder.

9. A catalyst according to claim 8, having undergone a sulfurization treatment.

10. A catalyst according to claim 9, wherein the volume of macropores in said silica-alumina is 20–70% of the total pore volume.

11. A catalyst according to claim 1, wherein the substrate consists of said silica-alumina.

12. A catalyst according to claim 1, wherein the substrate further comprising 1–40% by weight of a binder.

13. A catalyst according to claim 12, wherein the substrate comprises a mixture of said silica-alumina and at least one binder selected from the group consisting of silica, alumina, clays, titanium oxide, boron oxide and zirconium.

14. A catalyst according to claim 1, having undergone a sulfurization treatment.

15. A catalyst according to claim 14, wherein the substrate consists essentially of said silica-alumina.

16. A catalyst according to claim 1, wherein the volume of macropores in said silica-alumina is 20–70% of the total pore volume.

17. A catalyst according to claim 1, wherein the substrate consists essentially of said silica-alumina.

18. A process comprising hydrocracking of feedstocks with a catalyst according to claim 17, at a temperature of greater than 200° C., a pressure of greater than 0.1 Mpa, an amount of hydrogen of at least 50 1/l of feedstock, and an hourly volumetric flow rate of 0.1 to 20 volumes of feedstock per volume of catalyst and per hour.

19. A process comprising hydrocracking of feedstocks with a catalyst according to claim 15, at a temperature of greater than 200° C., a pressure of greater than 0.1 Mpa, an amount of hydrogen of at least 50 1/l feedstock, and an hourly volumetric flow rate of 0.1 to 20 volumes of feedstock per volume of catalyst and per hour.

20. A process comprising hydrocracking of feedstocks with a catalyst according to claim 1, at a temperature of greater than 200° C., a pressure of greater than 0.1 Mpa, an amount of hydrogen of at least 50 1/l of feedstock, and an hourly volumetric flow rate of 0.1 to 20 volumes of feedstock per volume of catalyst and per hour.

21. A process according to claim 20, wherein said feedstocks are selected from the group consisting of kerosenes, gas oils, vacuum gas oils, atmospheric residues, vacuum residues, atmospheric distillates, vacuum distillates, heavy fuels, oils, waxes, paraffins, waste oils, deasphalted residue, and deasphalted crudes, the feedstocks obtained from thermal conversion or catalytic conversion processes, said feedstocks containing less than 30% by weight of paraffins.

22. A process according to claim 20, wherein the feedstocks is first hydrotreated.

23. A process according to claim 20, wherein the hydrocracking is carried out in two stages with intermediate separation, and said catalyst is incorporated in at least one stage.

24. A process according to claim 20, wherein the feedstock contains less than 25% by weight of paraffin.

* * * * *

UNITED STATES PATENT AND TRADEMARK OFFICE
CERTIFICATE OF CORRECTION

PATENT NO. : 6,733,657 B2
DATED : May 11, 2004
INVENTOR(S) : Eric Benazzi et al.

It is certified that error appears in the above-identified patent and that said Letters Patent is hereby corrected as shown below:

Column 12,
Line 10, reads "dehydragenating" should read -- dehydrogenating --

Signed and Sealed this

Seventh Day of December, 2004

JON W. DUDAS
*Director of the United States Patent and Trademark Office*